United States Patent [19]
Park

[11] Patent Number: 5,442,392
[45] Date of Patent: Aug. 15, 1995

[54] NEGATIVE FILM IMAGE CONVERSION APPARATUS FOR VIDEO CAMERA

[75] Inventor: Jong B. Park, Seoul, Rep. of Korea

[73] Assignee: Goldstar Co., Ltd., Seoul, Rep. of Korea

[21] Appl. No.: 264,954

[22] Filed: Jun. 24, 1994

Related U.S. Application Data

[63] Continuation of Ser. No. 992,711, Dec. 18, 1992, abandoned.

[30] Foreign Application Priority Data

Dec. 21, 1991 [KR] Rep. of Korea .............. 23806/1991

[51] Int. Cl.$^6$ .................................... H04N 5/262
[52] U.S. Cl. ............................ 348/239; 348/578; 348/708
[58] Field of Search ............... 348/578, 642, 708, 527; H04N 1/40, 9/73, 5/262

[56] References Cited

U.S. PATENT DOCUMENTS

| | | | |
|---|---|---|---|
| 4,630,116 | 12/1986 | Isogawa | 358/160 |
| 4,635,101 | 1/1987 | Nakayama | 358/21 R |
| 4,866,513 | 12/1989 | Takahashi | 358/54 |
| 5,053,874 | 10/1991 | Stekelenburg | 358/214 |
| 5,198,892 | 3/1993 | Misawa | 348/239 |
| 5,311,322 | 5/1994 | Okino | 348/363 |

FOREIGN PATENT DOCUMENTS

| | | | |
|---|---|---|---|
| 0046382 | 4/1981 | Japan | 358/22 |
| 0136095 | 10/1981 | Japan | 358/54 |
| 0241378 | 11/1985 | Japan | 358/22 |
| 0263989 | 10/1988 | Japan | H04N 9/11 |
| 4170165 | 6/1992 | Japan | H04N 5/262 |

Primary Examiner—James J. Groody
Assistant Examiner—Chris Grant
Attorney, Agent, or Firm—John P. White

[57] ABSTRACT

A negative film image conversion apparatus for a video camera which is capable of obtaining an image of the same color and luminance as those of a real image upon shooting of a negative film as well as a general object. The negative film image conversion apparatus comprises a signal processor for obtaining a luminance signal and a plurality of color difference signals from an image signal inputted therein, a subtracter for subtracting the luminance signal from the signal processor from a predetermined reference signal, inverters for inverting the plurality of color difference signals from the signal processor, individually, and an encoder for combining output signals from the subtracter and the inverters and outputting the combined signal as a composite video signal.

4 Claims, 4 Drawing Sheets

NEGATIVE FILM IMAGE CONVERSION APPARATUS FOR VIDEO CAMERA

This application is a continuation of U.S. Ser. No. 07/992,711 filed Dec. 18, 1992, now abandoned.

BACKGROUND OF THE INVENTION

1. Field of the Invention

The present invention relates in general to a video camera, and more paticularly to a negative film shooting apparatus for a video camera which is suitable to shooting of a negative film.

2. Description of the Prior Art

For example, in a negative film which is obtained by photographing an object through a still camera, an obtained image has inverted colors and black and white as compared with a real image. Namely, the image of the negative film has complementary colors with respect to the colors of the real image. For this reason, the colors and black and white of the real image can be obtained by printing the negative film. In this connection, the negative film is used for the purpose of printing. In result, in the case where the negative film is shot by a general video camera, the image is obtained which has the complementary colors with respect to the colors of the real image. In this case, in order to obtain the image of the real colors from the negative film, the video camera must be provided with an additional apparatus for inverting the colors and black and white of the image obtained upon shooting the negative film.

Referring to FIG. 1, there is shown a block diagram of a conventional video camera with no negative film shooting function. As shown in this drawing, the conventional video camera comprises a signal processor 1 for obtaining a luminance signal Y and color difference signals R-Y and B-Y from an image signal inputted therein, and an encoder 2 for inputting the luminance signal Y and the color difference signal s R-Y and B-Y from the signal processor 1 and outputting a composite video signal CVS. Herein, the reference numeral R designates a red signal and the reference numeral B designates a blue signal.

Since the video camera mentioned above with reference to FIG. 1 has no separate apparatus for shooting the negative film, the image obtained upon shooting of the negative film has the complementary colors with respect to the colors of the real image.

Referring to FIG. 2, there is shown a block diagram of a conventional negative film shooting apparatus for a video camera having a function for inverting the colors of the image obtained upon shooting of the negative film such that the resultant image has the same colors as those of the real image. As shown in this figure, the conventional negative film shooting apparatus comprises a chrominance subcarrier oscillator 3 for oscillating a chrominance subcarrier, a first phase shifter 4 for shifting a phase of the chrominance subcarrier from the chrominance subcarrier oscillator 3 by 0°, a second phase shifter 5 for shifting the phase of the chrominance subcarrier from the chrominance subcarrier oscillator 3 by 180°, a third-phase shifter 6 for shifting the phase of the chrominance subcarrier from the chrominance subcarrier oscillator 3 by 90°, a fourth phase shifter 7 for shifting the phase of the chrominance subcarrier from the chrominance subcarrier oscillator 3 by 270°, a signal processor 8 for obtaining color difference signals R-Y and B-Y from an image signal inputted therein, first and second switches 9 and 10 for transferring the chrominance carrier from the chrominance carrier oscillator 3 to the first and third phase shifters 4 and 6 upon shooting of a general object and to the second and fourth phase shifters 5 and 7 upon shooting of the negative film, respectively, according to a user's selection, a first modulator 11 for modulating the color difference signal R-Y from the signal processor 8 in response to an output signal from the first phase shifter 4 or an output signal from the second phase shifter 5, a second modulator 12 for modulating the color difference signal B-Y from the signal processor 8 in response to an output signal from the third phase shifter 6 or an output signal from the fourth phase shifter 7, and a mixer 13 for mixing output signals from the first and second modulators 11 and 12 and outputting the mixed signal as a carrier chrominance signal.

In accordance with the conventional video camera of the construction mentioned above with reference to FIG. 2, the obtained color difference signals R-Y and B-Y are modulated by the chrominance subcarriers of the phase differences of 0° and 90° upon shooting of the general object and by the chrominance subcarriers of the phase differences of 180° and 270° upon shooting of the negative film, respectively. The color inverting effect can be obtained from the construction of FIG. 2 in which the obtained color difference signals R-Y and B-Y are modulated by the chrominance subcarriers of the phase differences of desired angles. Therefore, the image of the shot negative film has the same colors as those of the real image. This construction is shown in Japanese Utility Model Laid-Open Publication NO. Sho. 62-119080, applied by Japanese International Communication Co., Ltd.

However, the conventional video camera with the above-mentioned construction has the following disadvantages:

First, since the conventional video camera is not provided with an apparatus for inverting the luminance signal corresponding to the black and white of the image, the real image cannot perfectly be obtained upon shooting of the negative film. Namely, the image of the shot negative film has the inverted luminance signal as well as the inverted color signal. For this reason, with only the apparatus for inverting the color signal as shown in FIG. 2, the real image cannot perfectly be obtained upon shooting of the negative film.

Second, the conventional video camera negative film shooting apparatus performs the color signal inversion with the chrominance subcarrier phase shifters, in which undesired time delay may occur. As a result, the phase shifters each must have such an accurate construction as to prevent the time delay. However, the accurate construction of the phase shifter results in a complexity thereof.

SUMMARY OF THE INVENTION

Therefore, the present invention has been made in view of the above problems, and it is an object of the present invention to provide a negative film shooting apparatus for a video camera which is capable of obtaining an image of the same color and luminance as those of a real image upon shooting of a negative film as well as a general object.

In accordance with the present invention, the above object can be accomplished by a provision of a negative film shooting apparatus for a video camera, comprising: signal processing means for obtaining a luminance signal and a plurality of color difference signals from an image signal inputted therein; subtracting means for subtracting the luminance signal from said signal processing means from a predetermined reference signal; inverting means for inverting the plurality of color difference signals from said signal processing means, individually; and encoding means for combining output signals from said subtracting means and said inverting means and outputting the combined signal as a composite video signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
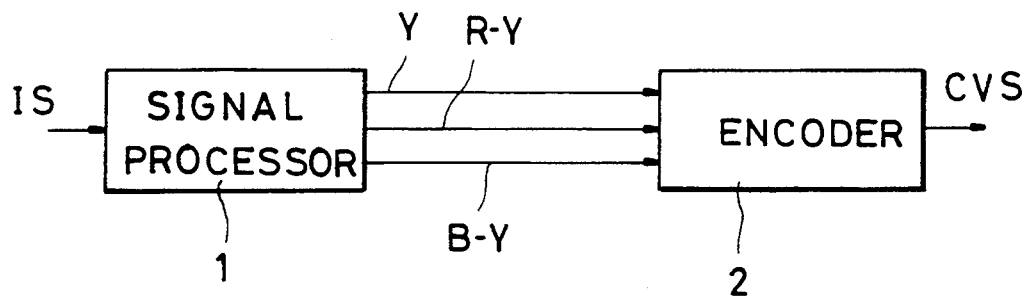
FIG. 1 is a block diagram of a conventional video camera with no negative film shooting function.
Figure 3:
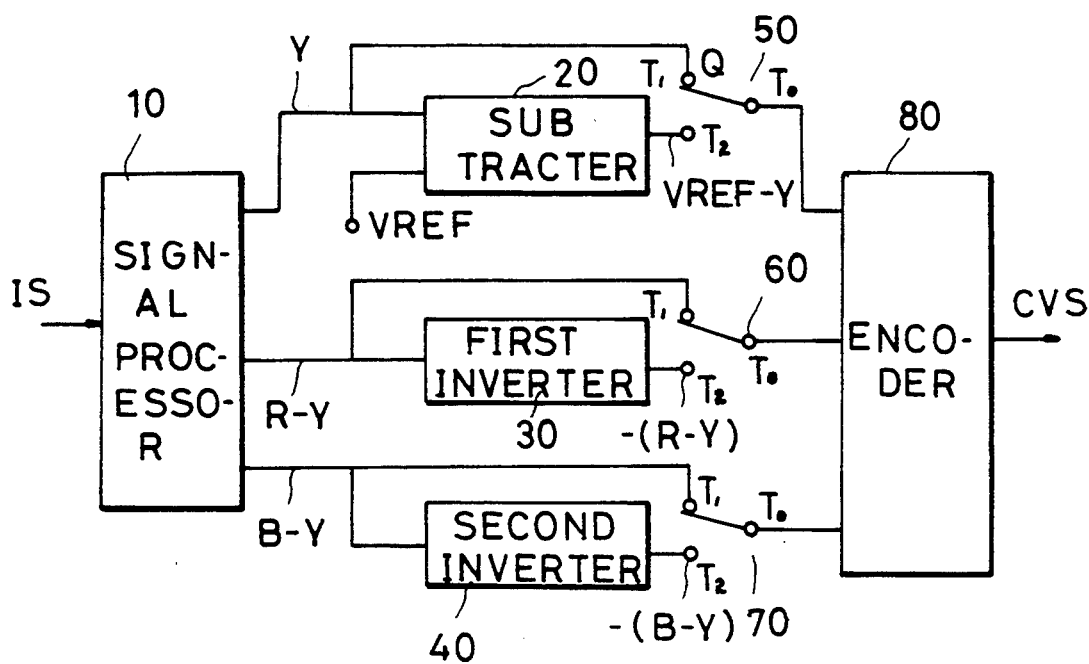
FIG. 3 is a block diagram of a negative film shooting apparatus for a video camera in accordance with the present invention.
Figure 2:
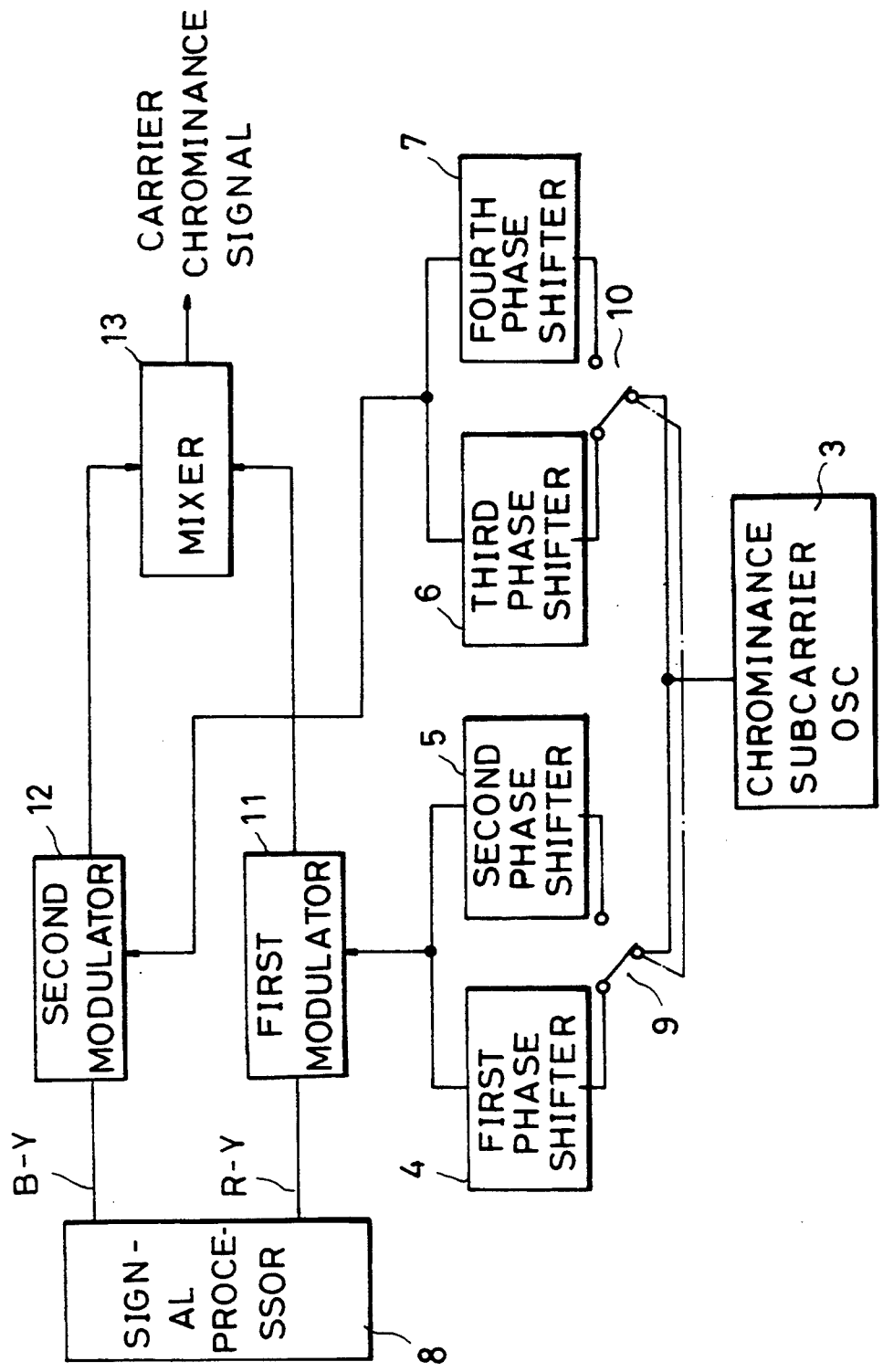
FIG. 2 is a block diagram of a conventional negative film shooting apparatus for a video camera.

Referring to FIG. 3, there is shown a block diagram of a negative film shooting apparatus for a video camera in accordance with the present invention. As shown in this figure, the negative film shooting apparatus of the present invention comprises a signal processor 10 for obtaining a luminance signal Y and color difference signals or a red-luminance signal R-Y and a blue-luminance signal B-Y from an image signal IS inputted therein, a subtracter 20 for subtracting the luminance signal Y from the signal processor 10 from a reference signal VREF which is preset as a white peak value of the luminance signal Y, a first inverter 30 for inverting the color difference signal R-Y from the signal processor 10, a second inverter 40 for inverting the color difference signal B-Y from the signal processor 10, a first switch 50 for inputting the luminance signal Y from the signal processor 10 and an output signal VREF-Y from the subtracter 20 and selectively outputting one of the inputted signals, a second switch 60 for inputting the color difference signal R-Y from the signal processor 10 and an output signal —(R-Y) from the first inverter 30 and selectively outputting one of the inputted signals, a third switch 70 for inputting the color difference signal B-Y from the signal processor 10 and an output signal —(B-Y) from the second inverter 40 and selectively outputting one of the inputted signals, and an encoder 80 for combining output signals from the first to third switches 50-70 and outputting the combined signal as a composite video signal CVS.

The operation of the video camera negative film shooting apparatus with the above-mentioned construction in accordance with the present invention will hereinafter be described in detail.

First, when a general object shooting function is selected by the user, output terminals To of the first to third switches 50-70 are connected to input terminals T1 thereof, respectively. As a result, the luminance signal Y and the color difference signals R-Y and B-Y from the signal processor 10 are applied directly to the encoder 80 through the corresponding switches 50-70, respectively. In result, the encoder 80 combines the luminance signal Y and the color difference signals R-Y and B-Y from the signal processor 10 and outputs the combined signal as the composite video signal CVS.

In other words, since an image of the general object shot by the video camera is positive, there is no necessity for inverting the color and luminance of the image of the shot object.

On the other hand, when a negative film shooting function is selected by the user, the output terminals To of the first to third switches 50-70 are connected to input terminals T2 thereof, respectively. As a result, the luminance signal Y and the color difference signals R-Y and B-Y of the shot image from the signal processor 10 are applied to the encoder 80 through the subtracter 20, the first inverter 30 and the second inverter 40 and then through the corresponding switches 50-70, respectively. In result, the encoder 80 combines the output signal VREF-Y from the first switch 50, the output signal —(R-Y) from the second switch 60 and the output signal —(B-Y) from the third switch 70 and outputs the combined signal as the composite video signal CVS.

In other words, since an image of the negative film shot by the video camera is negative and thus has the inverted color and luminance with respect to those of a real image, it can be inverted into the positive state by the subtracter 20, the first inverter 30 and the second inverter 40.

Figure 4A:
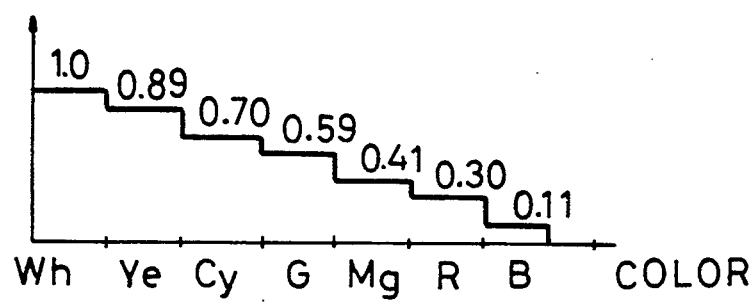
FIG. 4a is a waveform diagram of an input signal to a subtracter in the apparatus of FIG. 3.
Figure 4B:
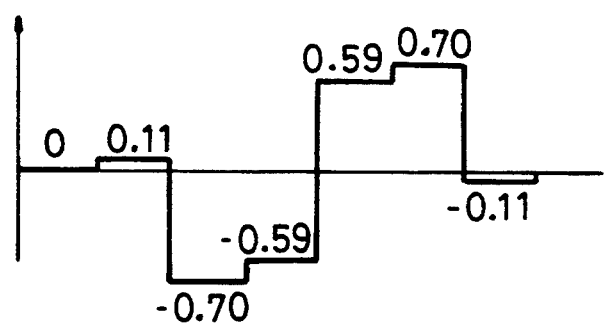
FIG. 4b is a waveform diagram of an input signal to a first inverter in the apparatus of FIG. 3.
Figure 4C:
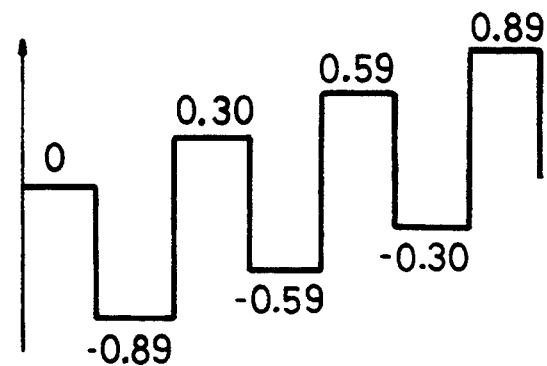
FIG. 4c is a waveform diagram of an input signal to a second inverter in the apparatus of FIG. 3.
Figure 4D:
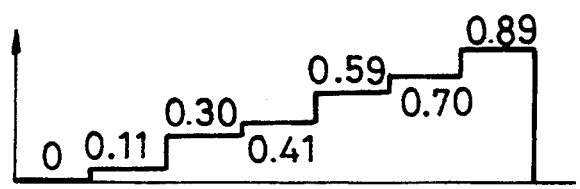
FIG. 4d is a waveform diagram of an output signal from the subtracter in the apparatus of FIG. 3.

In FIG. 3, the subtracter 20 is a circuit for the inversion of the luminance signal Y or black and white, and inputs the luminance signal Y as shown in FIG. 4a and outputs the inverted signal VREF-Y as shown in FIG. 4d.

Figure 4E:
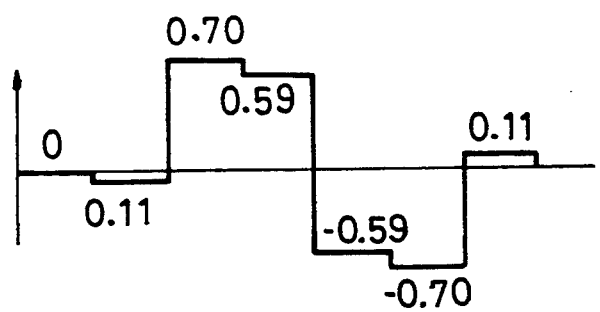
FIG. 4e is a waveform diagram of an output signal from the first inverter in the apparatus of FIG. 3.

The first inverter 30 is a circuit for the inversion of the red signal, and inputs the color difference signal R-Y as shown in FIG. 4b and outputs the inverted signal —(R-Y) as shown in FIG. 4e.

Figure 4F:
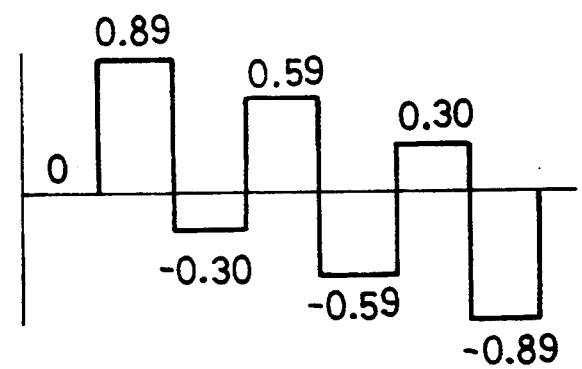
FIG. 4f is a waveform diagram of an output signal from the second inverter in the apparatus of FIG. 3.

The second inverter 40 is a circuit for the inversion of the blue signal, and inputs the color difference signal B-Y as shown in FIG. 4c and outputs the inverted signal —(B-Y) as shown in FIG. 4f.

As hereinbefore described, according to the present invention, there is provided the negative film shooting apparatus for the video camera with the above-mentioned simple construction which is capable of obtaining the image of the same color and luminance as those of the real image upon shooting of the negative film as well as the general object.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A negative film image conversion apparatus for a video camera, comprising:

signal processing means for generating a luminance output signal and a plurality of color difference output signals from an image signal of a negative film shot by the negative film image conversion apparatus;

subtracting means for subtracting the generated luminance output signal from said signal processing means from a predetermined reference signal which is a white peak value that is independent of the generated luminance output signal;

inverting means for directly inverting each color difference output signal of the plurality of color difference output signals from said signal processing means, individually; and encoding means for combining output signals from said subtracting means and said inverting means and outputting the combined signal as a composite video signal.

2. A negative film image conversion apparatus for a video camera as set forth in claim 1, further comprising:

switching means for inputting said output signals from said signal processing means, said subtracting means and said inverting means and outputting said output signals from said subtracting means and said inverting means upon shooting of said negative film and said output signals from said signal processing means upon shooting of a general object.

3. A negative film image conversion apparatus for a video camera, as set forth in claim 2, wherein said switching means includes:

a switch for inputting said luminance output signal from said signal processing means and said output signal from said subtracting means and selectively outputting one of these inputted output signals; and a plurality of switches, each for inputting a corresponding one of the plurality of color difference output signals from said signal processing means and a corresponding one of said output signals from said inverting means and selectively outputting one of these inputted output signals.

4. A negative film image conversion apparatus for a video camera, as set forth in claim 1, wherein the plurality of color difference output signals are a red-luminance signal and a blue-luminance signal.

* * * * *